(12) United States Patent
Hara et al.

(10) Patent No.: US 9,372,714 B2
(45) Date of Patent: Jun. 21, 2016

(54) INFORMATION TERMINAL APPARATUS AND METHOD FOR SWITCHING CONTROL OF A USER INTERFACE BETWEEN CONCURRENTLY EXECUTING OPERATING SYSTEMS

(75) Inventors: Yasushi Hara, Yokohama (JP); Katsumi Otsuka, Kawasaki (JP); Masahide Noda, Kawasaki (JP); Takeo Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 394 days.

(21) Appl. No.: 13/455,238

(22) Filed: Apr. 25, 2012

(65) Prior Publication Data

US 2012/0311578 A1    Dec. 6, 2012

(30) Foreign Application Priority Data

Jun. 3, 2011 (JP) .................................. 2011-125276

(51) Int. Cl.
*G06F 9/455* (2006.01)
*G06F 9/44* (2006.01)
*G06F 3/038* (2013.01)

(52) U.S. Cl.
CPC .......... *G06F 9/45558* (2013.01); *G06F 9/4443* (2013.01); *G06F 9/4445* (2013.01); *G06F 3/038* (2013.01)

(58) Field of Classification Search
CPC .............. G06F 9/45558; G06F 9/4445; G06F 2009/45575; G06F 9/4443; G06F 3/038
USPC .......................................................... 718/1
See application file for complete search history.

(56) References Cited

U.S. PATENT DOCUMENTS

| | | | | |
|---|---|---|---|---|
| 7,016,706 | B2 * | 3/2006 | Kurokawa et al. ............ | 455/566 |
| 7,877,592 | B2 * | 1/2011 | Sun et al. ........................ | 713/100 |
| 8,024,742 | B2 * | 9/2011 | Lescouet et al. ............... | 718/108 |
| 8,314,805 | B2 * | 11/2012 | Wang ..................... | G06F 9/5077 345/520 |
| 2003/0033344 | A1 * | 2/2003 | Abbott et al. ...................... | 709/1 |
| 2008/0184274 | A1 | 7/2008 | Ohta et al. | |
| 2009/0150884 | A1 * | 6/2009 | Fukuda ................. | G06F 9/4443 718/1 |
| 2009/0240924 | A1 * | 9/2009 | Yasaki ................ | G06F 9/45558 712/220 |
| 2010/0037243 | A1 * | 2/2010 | Mo et al. ........................ | 719/328 |
| 2011/0126139 | A1 * | 5/2011 | Jeong .................... | G06F 3/0482 715/767 |
| 2011/0154328 | A1 * | 6/2011 | Mo et al. ........................... | 718/1 |
| 2011/0185396 | A1 * | 7/2011 | Ohta et al. ........................ | 726/1 |
| 2012/0204126 | A1 * | 8/2012 | Yoshimura ..................... | 715/778 |
| 2013/0125126 | A1 * | 5/2013 | Yokota ....................... | G06F 9/48 718/102 |
| 2015/0033225 | A1 * | 1/2015 | Rothman ............. | G06F 9/45533 718/1 |

* cited by examiner

FOREIGN PATENT DOCUMENTS

JP    2007-129343    5/2007
JP    2008-52714    3/2008

*Primary Examiner* — Meng An
*Assistant Examiner* — Willy W Huaracha
(74) *Attorney, Agent, or Firm* — Staas & Halsey LLP

(57) ABSTRACT

An information terminal apparatus includes a memory and a processor. The memory stores information indicating a front operating system. The processor runs a first virtual machine that executes a first operating system. The processor runs a second virtual machine that executes a second operating system. The processor controls user interface of the information terminal apparatus by executing the front operating system. The processor detects, by referring to the information stored in the memory, that the front operating system is changed from the first operating system to the second operating system. The processor notifies, upon the detection, the first virtual machine of a first notification indicating that the user interface stops. The processor notifies, upon the detection, the second virtual machine of a second notification indicating that the user interface restarts.

8 Claims, 17 Drawing Sheets

FIG. 6

| INCOMING INFORMATION TABLE | |
|---|---|
| SERVICE ID | OS-ID |
| S1 | OS#1 |
| S2 | OS#2 |
| S3 | OS#1 |
| ⋮ | ⋮ |

185

INFORMATION TERMINAL APPARATUS AND METHOD FOR SWITCHING CONTROL OF A USER INTERFACE BETWEEN CONCURRENTLY EXECUTING OPERATING SYSTEMS

CROSS-REFERENCE TO RELATED APPLICATION

This application is based upon and claims the benefit of priority of the prior Japanese Patent Application No. 2011-125276, filed on Jun. 3, 2011, the entire contents of which are incorporated herein by reference.

FIELD

The embodiments discussed herein are related to an information terminal apparatus.

BACKGROUND

Information terminal apparatuses, such as cellular telephones and portable information terminals, are now being used. Examples of information terminal apparatuses are so-called smartphones and personal digital assistants (PDAs). An information terminal apparatus executes, for example, an operating system (OS) for controlling user interfaces. Control for user interfaces includes control for displaying screens on a display device and control for outputting sound from a speaker. Under the OS, application programs for performing processing that involves usage of user interfaces, such as a playback operation of moving pictures and sending and receiving of emails, may be executed.

In the field of server computers, a virtualization technology for running a plurality of virtual computers (may also be called virtual machines) on a physical computer (may also be called a physical machine) is now being utilized. A physical machine utilizing a virtualization technology causes each of two or more virtual machines to execute an OS and thereby may execute a plurality of OSs in parallel. A physical machine running a plurality of virtual machines executes control software (may also be called a hypervisor) for allocating resources such as a central processing unit (CPU) and a random access memory (RAM) to the virtual machines.

A computer system of related art sets one of two OSs in the operating state (active state) and the other in the suspended state (inactive state) so that one of the two OSs is exclusively executed. Additionally, a cellular telephone of related art may execute an OS for a personal computer, which is stored in an external apparatus, and upon detecting an incoming telephone call, the cellular telephone stops executing the OS for the personal computer and starts an OS for the cellular telephone.

Japanese Laid-open Patent Publication No. 2008-52714 and Japanese Laid-open Patent Publication No. 2007-129343 disclose related techniques.

SUMMARY

According to an aspect of the present invention, provided is an information terminal apparatus including a memory and a processor. The memory stores information indicating a front operating system. The processor runs a first virtual machine that executes a first operating system. The processor runs a second virtual machine that executes a second operating system. The processor controls user interface of the information terminal apparatus by executing the front operating system. The processor detects, by referring to the information stored in the memory, that the front operating system is changed from the first operating system to the second operating system. The processor notifies, upon the detection, the first virtual machine of a first notification indicating that the user interface stops. The processor notifies, upon the detection, the second virtual machine of a second notification indicating that the user interface restarts.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of an incoming information table;

DESCRIPTION OF EMBODIMENTS

By utilizing a virtualization technology, it may be possible for an information terminal apparatus, such as a cellular telephone or a portable information terminal, to execute a plurality of OSs. For example, an OS suitable for playing back moving pictures and an OS suitable for sending and receiving emails may be executed in parallel. In this case, the information terminal apparatus may switch between the OSs to control a user interface in accordance with one of the OSs. For example, when playing back moving pictures after sending an email, the information terminal apparatus changes the OS to which a display device is assigned and thereby switches the OS for controlling display of screens on the display device.

However, if the information terminal apparatus is allowed to execute a plurality of OSs by utilizing a known virtualization technology, an OS to which the right to control a user interface is not assigned is continually executed in the background, thereby increasing the load on the information terminal apparatus. For example, assume that the information terminal apparatus receives an email while playing back moving pictures, and thus changes the OS for controlling display of screens on a display device. In this case, if the information terminal apparatus merely changes the OS to which the display device is assigned, the OS for controlling display of screens on the display device before the switching may allow an application program for playing back moving pictures to be continually executed.

An increased load on the information terminal apparatus caused by the background processing also increases power consumption of the information terminal apparatus. Additionally, the processing speed of executing the OS for controlling display of screens on the display device after the switching is decreased.

Embodiments will be described below with reference to the accompanying drawings.

First Embodiment

Figure 1:
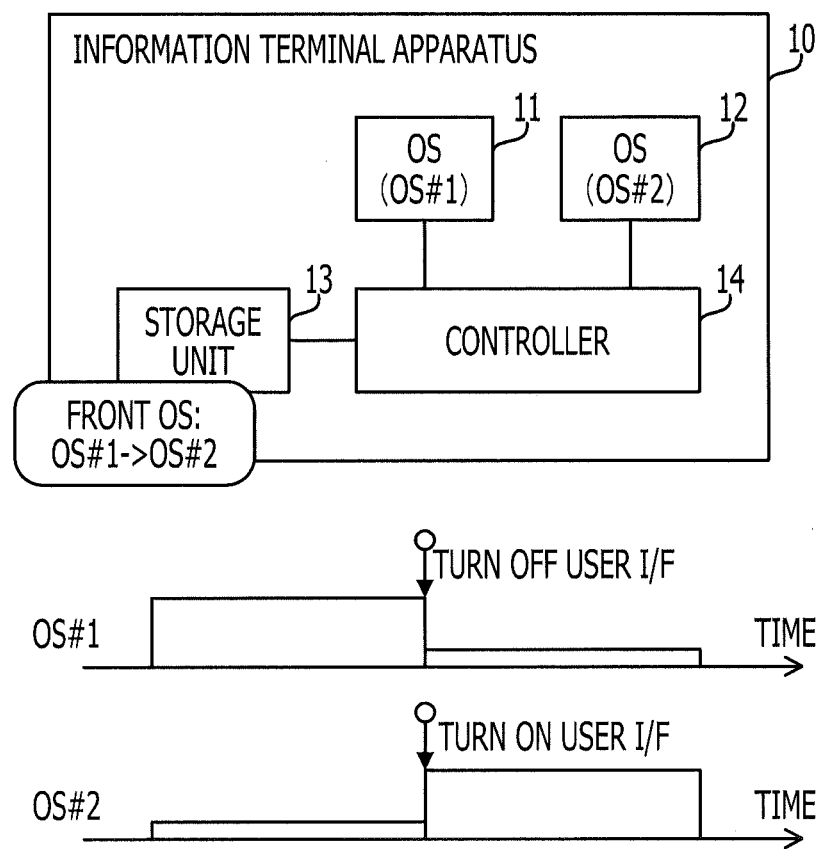
FIG. 1 illustrates an information terminal apparatus according to a first embodiment.

FIG. 1 illustrates an information terminal apparatus 10 according to a first embodiment. The information terminal apparatus 10 may execute OSs 11 and 12 (OS #1 and OS #2) concurrently. Concurrent execution of a plurality of OSs includes execution of a plurality of OS programs by using different processors and execution of a plurality of OS programs by using a single processor in a time division manner. Examples of the information terminal apparatus 10 are a cellular telephone and a portable information terminal having a wireless communication function.

The information terminal apparatus 10 includes a storage unit 13 and a controller 14. The information terminal apparatus 10 may include a computer having a CPU and a RAM. As the storage unit 13, a volatile memory, such as a RAM, or a non-volatile memory, such as a flash memory, may be used. The controller 14 may be implemented with a general-purpose processor, such as a CPU, by executing a program or may be implemented as an electronic circuit (hardware) which performs the following processing.

The storage unit 13 stores therein information indicating a front OS, for example, an identifier (ID) of the front OS. The front OS is the OS for controlling a user interface of the information terminal apparatus 10 and one of the OSs 11 and 12 executed on the information terminal apparatus 10. Control for a user interface includes control for displaying screens on a display device provided in the information terminal apparatus 10 and control for outputting sound from a speaker. A processing result of an application program executed on the front OS may be output to the user interface. However, a processing result of an application program executed on another OS may not be output to the user interface.

The controller 14 refers to the storage unit 13 and detects that the front OS is to be switched from a first OS (e.g., the OS 11) to a second OS (e.g., the OS 12). For example, upon detecting an event indicating that the front OS is to be switched, the controller 14 refers to the storage unit 13 to check the current front OS and determines the first OS, which is an OS to be switched OFF, and the second OS, which is an OS to be switched ON. An event indicating that the front OS is to be switched includes an event indicating that a user operates a button provided in the information terminal apparatus 10 to give an instruction to change the front OS and an event indicating that an incoming message (e.g., an incoming telephone call) to be processed in accordance with an OS other than the current front OS is received from a network.

Then, the controller 14 informs a first processor or first virtual machine (VM) executing the first OS to be switched OFF that the operation of the user interface is to stop and informs a second processor or second VM executing the second OS to be switched ON that the operation of the user interface is to restart. The information that the operation of the user interface is to stop may be information that the screen display of the display device is to be turned OFF or information that an operation giving an instruction to turn OFF the screen display has been received from the user. The information that the operation of the user interface is to restart may be information that the screen display of the display device is to be turned ON or information that an operation giving an instruction to turn ON the screen display has been received from the user.

The processor or VM, which has been informed that the operation of the user interface is to stop, stops processing that involves usage of the user interface and is ready to shift from the start state (active state) to the standby state (sleep state). For example, the processor or VM which has been informed that the screen display is to be turned OFF stops execution of an application program for performing screen display and performs control to stop generating screen frames to be output to the display device. In contrast, the processor or VM which has been informed that the operation of the user interface is to restart may promptly shift from the sleep state to the active state. For example, the processor or VM which has been informed that the screen display is to be turned ON performs control to restart generating screen frames to be output to the display device.

The information terminal apparatus 10 of the first embodiment detects that, among a plurality of OSs, the front OS for controlling the user interface of the information terminal apparatus 10 is to be switched from the first OS to the second OS. Accordingly, the information terminal apparatus 10 informs the first processor or first VM executing the first OS that the operation of the user interface is to stop and informs the second processor or second VM executing the second OS that the operation of the user interface is to restart.

With this operation, when switching the front OS, it is possible that the processor or VM executing the OS to be switched OFF recognizes that the operation of the user interface is to stop in a virtual manner (e.g., screen display of a display device is turned OFF) and that the processor or VM executing the OS to be switched ON recognizes that the operation of the user interface is to restart in a virtual manner (e.g., screen display of a display device is turned ON). It may thus be expected that the execution of processing in the background will be suppressed, e.g., the processor or VM executing the OS to be switched OFF will partially or entirely stop processing that involves usage of the user interface. It is thus possible to reduce the load on the information terminal apparatus 10, thereby reducing the power consumption and improving the processing speed.

Second Embodiment

Figure 2:
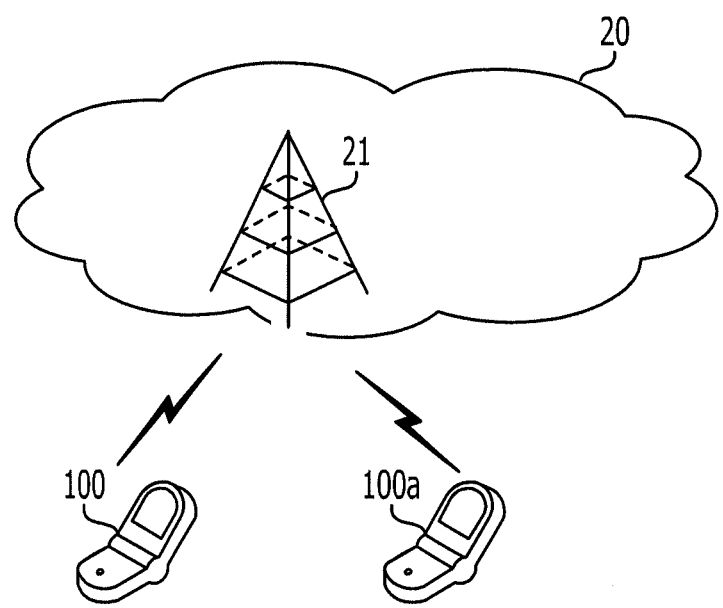
FIG. 2 illustrates an information processing system according to a second embodiment.

FIG. 2 illustrates an information processing system according to a second embodiment. The information processing system of the second embodiment includes information terminal apparatuses 100 and 100a and a mobile communication network 20. The information terminal apparatuses 100 and 100a may be cellular telephones called smartphones, or portable information terminals called PDAs. The mobile communication network 20 may be a wireless access network utilizing a wireless communication system, such as Wideband Code Division Multiple Access (W-CDMA), Long Term Evolution (LTE), Worldwide Interoperability for Microwave Access (WiMAX), or a wireless local area network (LAN).

The information terminal apparatuses 100 and 100a connect to a base station 21 provided in the mobile communication network 20 and perform communication, such as voice communication, Hypertext Transfer Protocol (HTTP) communication with a web server, sending and receiving of emails, and receiving of moving picture streams, via the base station 21. The information terminal apparatuses 100 and 100a also run virtual machines by using a virtualization technology. Each of the information terminal apparatuses 100 and 100a causes at least two VMs to execute respective OSs. A suitable OS is selected from among two or more OSs in accordance with the type of processing. In the following second embodiment, a case in which the information terminal apparatus 100 controls processing that involves communication, such as that described above, while switching between two OSs will be considered.

Figure 3:
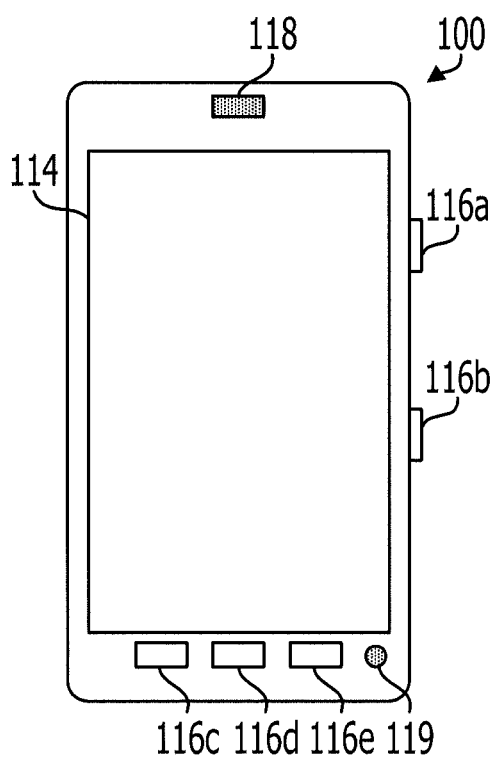
FIG. 3 illustrates an example of an outer configuration of an information terminal apparatus.

FIG. 3 illustrates an example of the outer configuration of the information terminal apparatus 100. The information terminal apparatus 100 includes, as user interfaces, a display device 114, buttons 116a, 116b, 116c, 116d, and 116e, a speaker 118, and a microphone 119.

The display device 114 is disposed, for example, at the center of the front side of a housing of the information terminal apparatus 100. The buttons 116a and 116b are disposed, for example, at the right side of the housing. The buttons 116c, 116d, and 116e are disposed, for example, at the bottom portion of the front side of the housing. The speaker 118 is disposed, for example, at the top portion of the front side of the housing. The microphone 119 is disposed, for example, at the bottom right portion of the front side of the housing.

The button 116a is used for switching between the OSs. When the button 116a is pressed, the information terminal apparatus 100 changes the front OS for controlling display of screens on the display device 114. The button 116b is used for switching ON/OFF of power or ON/OFF of screen display. When the button 116b is pressed and held, the information terminal apparatus 100 switches power from ON to OFF (e.g., stopping the processor) or from OFF to ON (e.g., restarting the processor). When the button 116b is pressed for a short time, the information terminal apparatus 100 switches displaying of screens on the display device 114 from ON to OFF (e.g., turning OFF backlight of the display device 114) or from OFF to ON (e.g., turning ON backlight of the display device 114).

The button 116c is a menu button. When the button 116c is pressed, the information terminal apparatus 100 displays a menu indicating operation items related to a screen which is currently displayed on the display device 114. The button 116d is a home button. When the button 116d is pressed, the information terminal apparatus 100 returns the screen displayed on the display device 114 to a predetermined home screen. The button 116e is a back button. When the button 116e is pressed, the information terminal apparatus 100 returns the screen displayed on the display device 114 to the previous screen.

Figure 4:
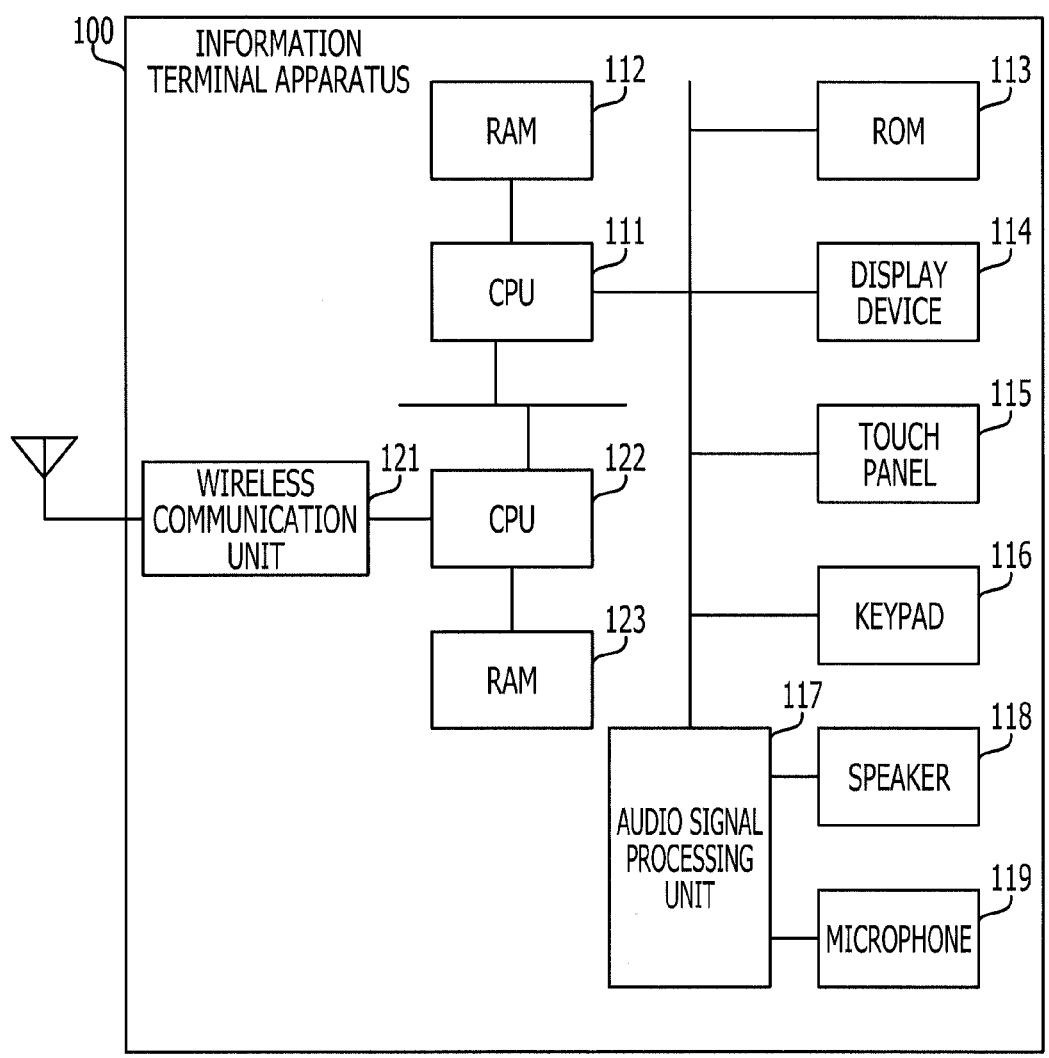
FIG. 4 is a block diagram illustrating an exemplary hardware configuration of an information terminal apparatus.

FIG. 4 is a block diagram illustrating an exemplary hardware configuration of the information terminal apparatus 100. The information terminal apparatus 100 includes CPUs 111 and 122, RAMs 112 and 123, a read only memory (ROM) 113, a display device 114, a touch panel 115, a keypad 116, an audio signal processing unit 117, a speaker 118, a microphone 119, and a wireless communication unit 121.

The CPU 111 executes programs, such as OS programs, driver programs, and application programs, and controls devices provided in the information terminal apparatus 100. For example, the CPU 111 displays screens on the display device 114 and receives input from the keypad 116. The CPU 111 reads at least some of programs and data stored in the ROM 113 and loads the read program and data to the RAM 112, thereby executing the program.

The RAM 112 is a volatile memory in which programs and data used by the CPU 111 are temporarily stored. The information terminal apparatus 100 may include another type of volatile memory.

The ROM 113 is a non-volatile memory storing therein programs and data. Examples of programs stored in the ROM 113 are OS programs, application programs, and driver programs for the devices provided in the information terminal apparatus 100. The information terminal apparatus 100 may include another type of non-volatile memory, such as a flash memory.

The display device 114 obtains screen frames from the CPU 111 and displays the screens. As the display device 114, a liquid crystal display (LCD) or an organic electroluminescence (EL) display may be used. The display device 114 is disposed, for example, under the touch panel 115, and the screen of the display device 114 may be seen through the touch panel 115 from the front side of the housing.

The touch panel 115 detects that a touch operation has been performed by a user, and informs the CPU 111 of a position touched by the user as an input signal. The user performs a touch operation on the touch panel 115 by using a pointing device, such as a touch pen, or a user's finger while seeing a screen displayed on the display device 114. The position touched by the user may be detected by using a detection method, such as a matrix switching, resistive, surface acoustic wave (SAW), infrared, electromagnetic induction, or capacitive detection method.

The keypad 116 has a plurality of physical buttons including the above-described buttons 116a, 116b, 116c, 116d, and 116e. Upon pressing any one of the buttons by the user, the keypad 116 supplies an input signal representing the pressed button to the CPU 111.

The audio signal processing unit 117 performs audio signal processing under the control of the CPU 111. The audio signal processing unit 117 processes digital audio data obtained from the CPU 111 and outputs an audio signal to the speaker 118. The audio signal processing unit 117 also processes an audio signal obtained from the microphone 119 and outputs digital audio data to the CPU 111.

The speaker 118 converts an electric signal obtained from the audio signal processing unit 117 as an audio signal into physical vibration, thereby playing back sound. For example, when a user performs telephone conversation, voice of the other communication party or background noise is output from the speaker 118.

The microphone 119 converts physical vibration of sound into an electric signal and thereby receives sound, and outputs the electric signal to the audio signal processing unit 117 as an audio signal. For example, when the user performs telephone conversation, user's voice or background noise is input through the microphone 119.

The wireless communication unit 121 performs wireless communication with the base station 21 in accordance with a wireless communication system employed by the mobile communication network 20. The wireless communication unit 121 performs demodulation and error correcting decoding on a wireless signal received by an antenna provided in the information terminal apparatus 100, and outputs a digital baseband (DBB) signal to the CPU 122. The wireless communication unit 121 also performs modulation and error correcting coding on a DBB signal obtained from the CPU 122, and outputs a wireless signal through the antenna.

The CPU 122 is a processor that processes DBB signals. The CPU 122 processes a DBB signal received from the wireless communication unit 121 and outputs extracted received data to the CPU 111. The received data includes incoming data indicating that an incoming telephone call from the mobile communication network 20 has been received. The CPU 122 also processes transmission data obtained from the CPU 111 and outputs a DBB signal to the wireless communication unit 121. The CPU 122 loads at least some of programs and data used for processing DBB signals into the RAM 123 and executes the program.

The RAM 123 is a volatile memory in which programs and data used by the CPU 122 are temporarily stored. The information terminal apparatus 100 may use another type of volatile memory.

The CPUs 111 and 122 send and receive data via a bus different from a bus to which, for example, the display device 114 and the touch panel 115 are connected.

Figure 5:
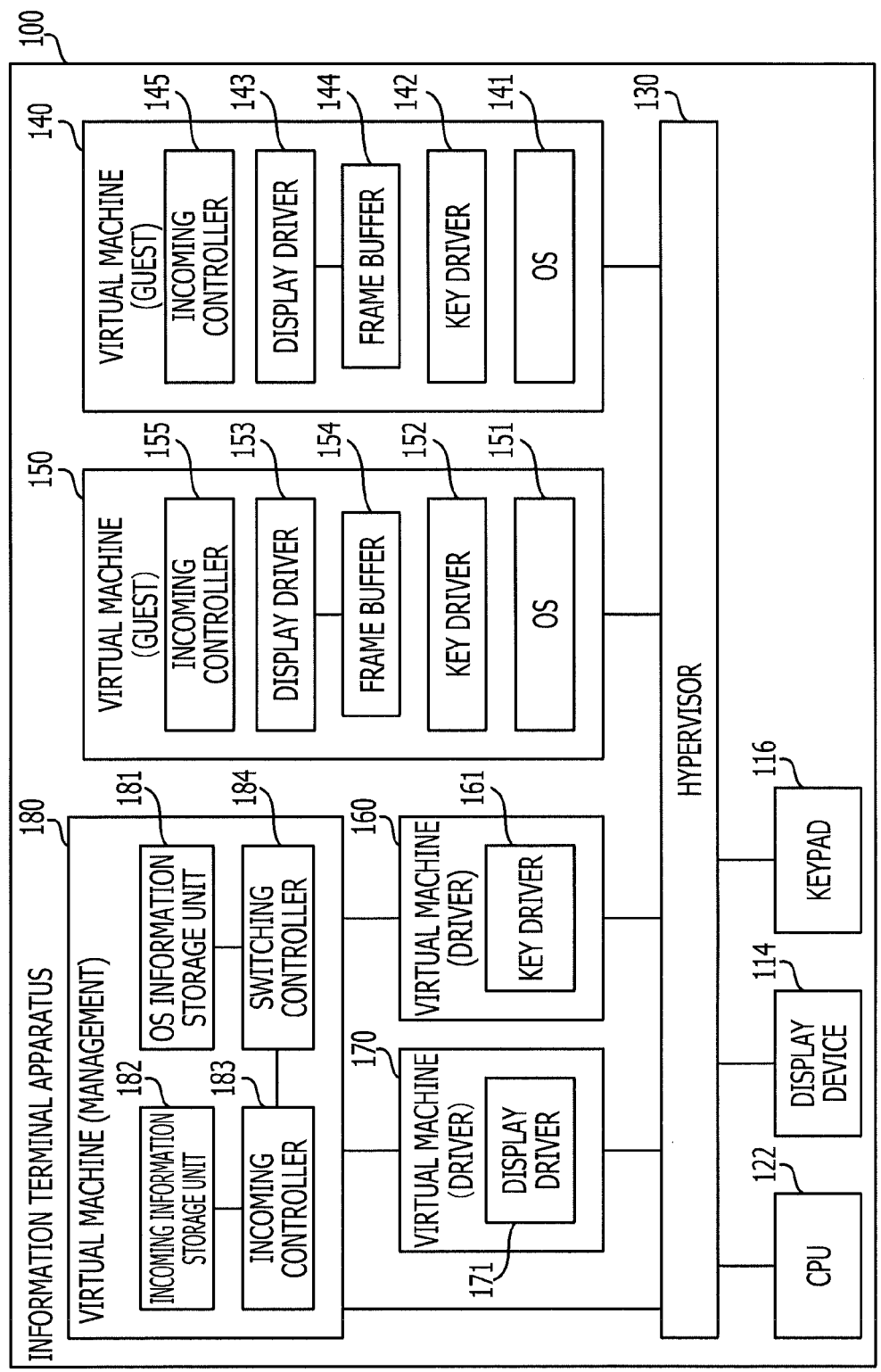
FIG. 5 is a block diagram illustrating an exemplary functional configuration of an information terminal apparatus.

FIG. 5 is a block diagram illustrating an exemplary functional configuration of the information terminal apparatus 100. The information terminal apparatus 100 includes a hypervisor 130 and virtual machines 140 through 180. All of the hypervisor 130 and the virtual machines 140 through 180 may be implemented as program modules, or at least some of them may be implemented as an electronic circuit.

The hypervisor 130 allocates resources, such as the performance of the CPU 111 and storage regions of the RAM 112, to the virtual machines 140 through 180. The hypervisor 130 also relays information communicated among the virtual machines 140 through 180 and information communicated between devices provided in the information terminal apparatus 100 and the virtual machines 160 through 180.

The virtual machines 140 and 150 are virtual machines that execute application software or an OS (so-called guest OS). The virtual machines 140 and 150 may execute different types of application software. The virtual machine 140 may, for example, execute voice communication software, a web browser for performing HTTP communication, or playback software for moving pictures. The virtual machine 150 may, for example, execute voice communication software or email sending and receiving software. The virtual machines 140 and 150 may execute the same OS or different OSs.

The virtual machine 140 includes an OS 141 (OS #1), a key driver 142, a display driver 143, a frame buffer 144, and an incoming controller 145. The virtual machine 150 includes, similar to the virtual machine 140, an OS 151 (OS #2), a key driver 152, a display driver 153, a frame buffer 154, and an incoming controller 155. Here, for simplicity, the word "OS" is used to refer to a functional unit of a virtual machine, which is achieved by executing the OS.

The OSs 141 and 151 each manage resources allocated by the hypervisor 130, and control execution of drivers and application software executed by the virtual machines 140 and 150. The key drivers 142 and 152 each receive notification indicating that a user has performed an input operation on the keypad 116, and supply such notification to the OSs 141 and 151 of the virtual machines 140 and 150. The display drivers 143 and 153 each generate screen frames indicating frames to be displayed on the display device 114 under the control of the OSs 141 and 151 of the virtual machines 140 and 150. The frame buffers 144 and 154 temporarily store therein the generated screen frames and sequentially output the stored frames to the display device 114. The incoming controllers 145 and 155 each receive notification indicating an incoming call from the mobile communication network 20 and perform processing for starting voice communication.

The virtual machine 160 is a driver virtual machine that processes an input signal received from the keypad 116. The virtual machine 160 includes a key driver 161. The key driver 161 receives an input signal representing user input from the keypad 116 and informs the virtual machine 180 that there has been user input. In response to an instruction from the virtual machine 180, the key driver 161 also informs the OSs 141 and 151 via the key drivers 142 and 152, respectively, that there has been user input.

The virtual machine 170 is a driver virtual machine that switches screens to be displayed on the display device 114. The virtual machine 170 includes a display driver 171. The display driver 171 assigns the display device 114 to one of the OSs 141 and 151 in response to an instruction from the virtual machine 180. For example, the display driver 171 switches the path of screen frames so that the display device 114 obtains screen frames output from the frame buffer 144 or screen frames output from the frame buffer 154, and displays the obtained screen frames. Even if screen frames concerning the OS to which the display device 114 is not assigned are generated, they are not displayed on the display device 114.

The virtual machine 180 is a virtual machine that manages other virtual machines and receives incoming telephone calls from the mobile communication network 20. The virtual machine 180 includes an OS information storage unit 181, an incoming information storage unit 182, an incoming controller 183, and a switching controller 184.

The OS information storage unit 181 stores therein OS information indicating to which one (front OS) of the OSs 141 and 151 the display device 114 is assigned. As the OS information, the ID of the front OS or the ID of the virtual machine including the front OS may be used. The incoming information storage unit 182 stores therein incoming information indicating the association between communication services (e.g., a service for voice communication only or a service for voice and video communication) and the OSs that may process the communication services.

The incoming controller 183 obtains, from the CPU 122, incoming data indicating an incoming call from the mobile communication network 20. The incoming data includes a service ID indicating a communication service desired by the other communication party. The service ID is added to incoming data by the information terminal apparatus of the other communication party or the mobile communication network 20. The incoming controller 183 refers to the incoming information storage unit 182 and determines the OS that processes the received incoming call. The incoming controller 183 then notifies the switching controller 184 of the determined OS, and also notifies the incoming controller, which is executed under the determined OS, of the incoming data.

The switching controller 184 controls switching of the front OS. Upon receiving from the key driver 161 information indicating that a user has performed an input operation (depression of the button 116a) to give an instruction to change the OS, the switching controller 184 refers to the OS information storage unit 181 and checks the current front OS. Then, the switching controller 184 instructs the key driver 161 to give such information to the OS to be switched OFF and to the OS to be switched ON. The switching controller 184 also instructs the display driver 171 to switch screens. Additionally, upon being informed of the OS that processes an incoming call by the incoming controller 183, the switching controller 184 refers to the OS information storage unit 181 and determines whether to change the front OS. Upon determining to change the front OS, the switching controller 184 gives instructions to the key driver 161 and the display driver 171, as has been performed when receiving information that user input has been received.

The OSs 141 and 151 are examples of the OSs 11 and 12 of the first embodiment. The OS information storage unit 181 is an example of the storage unit 13 of the first embodiment. The switching controller 184 is an example of the controller 14 of the first embodiment. Although the key driver 161 and the display driver 171 are executed by the independent virtual machines 160 and 170, respectively, in FIG. 5, they may be executed by another virtual machine (e.g., virtual machine 180). The switching control of the front OS may be performed by the virtual machine 160 instead of the virtual machine 180.

FIG. 6 illustrates an example of an incoming information table 185. The incoming information table 185 is stored in the incoming information storage unit 182. The incoming information table 185 includes fields for the service ID and the OS-ID. In the service ID field, the ID for identifying a communication service that may be specified by the other communication party is registered. The service ID is included in incoming data received from the mobile communication network 20. In the OS-ID field, the ID of the OS (OS 141 or 151) that may handle the communication service identified by the service ID is registered. Instead of the ID of the OS, the ID of the virtual machine executing that OS may be used.

Figure 7:
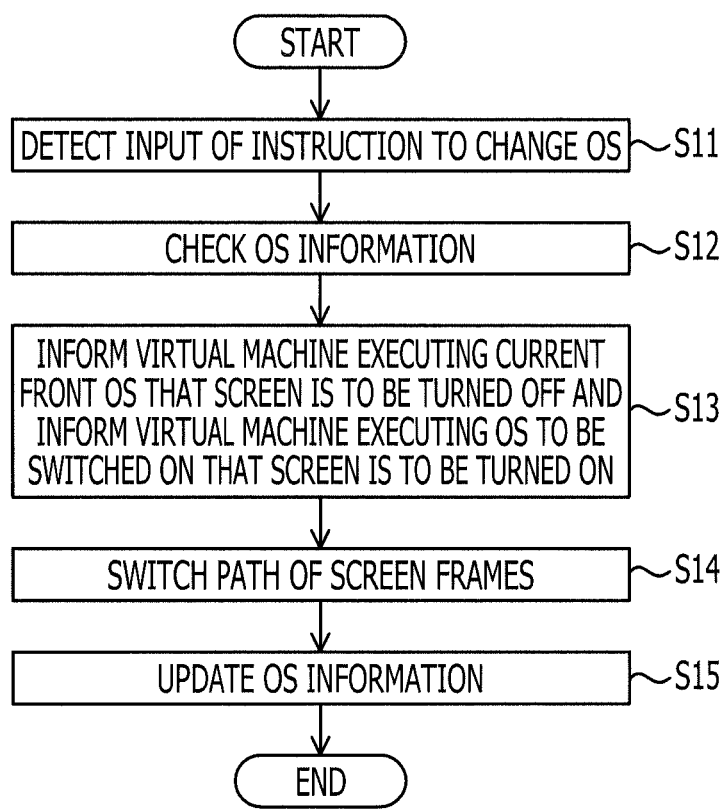
FIG. 7 is a flowchart illustrating switching control of OSs in response to input from a user.

FIG. 7 is a flowchart illustrating the switching control of the OSs in response to input from a user. The processing illustrated in FIG. 7 will be described below in the order of reference numbers.

In S11, when a user presses the button 116a, the keypad 116 outputs an input signal to the key driver 161. The key driver 161 detects on the basis of the input signal that a user has performed an input operation to give an instruction to change the OS, and informs the switching controller 184 that input from a user has been received. The switching controller 184 detects on the basis of the information received from the key driver 161 that an instruction to change the OS has been received from the user.

In S12, the switching controller 184 refers to the OS information stored in the OS information storage unit 181 and checks the current front OS. The following description of the flowchart of FIG. 7 will be given, assuming that the current front OS is the OS 141.

In S13, the switching controller 184 determines that the front OS is to be switched from the OS 141 to the OS 151. The switching controller 184 then instructs the key driver 161 to inform the OS 141 (current front OS) to be switched OFF that user input indicating an instruction to switch OFF the screen has been received and to inform the OS 151 to be switched ON that user input indicating an instruction to switch ON the screen has been received. The key driver 161 supplies, via the key driver 142, virtual information that a user has performed an input operation (depression of the button 116b) to give an instruction to switch OFF the screen to the OS 141. The key driver 161 also supplies, via the key driver 152, virtual information that a user has performed an input operation (depression of the button 116b) to give an instruction to switch ON the screen to the OS 151.

In S14, the switching controller 184 instructs the display driver 171 of the virtual machine 170 to switch the path of screen frames to be output to the display device 114. The display driver 171 changes the OS to which the display device 114 is assigned from the OS 141 to the OS 151, and switches the path of screen frames. For example, the switching controller 184 controls the display device 114 so that the display device 114 displays screen frames output from the frame buffer 154 and does not display screen frames output from the frame buffer 144.

In S15, the switching controller 184 writes information indicating that the front OS is the OS 151 into the OS information storage unit 181 as the OS information.

Figure 8:
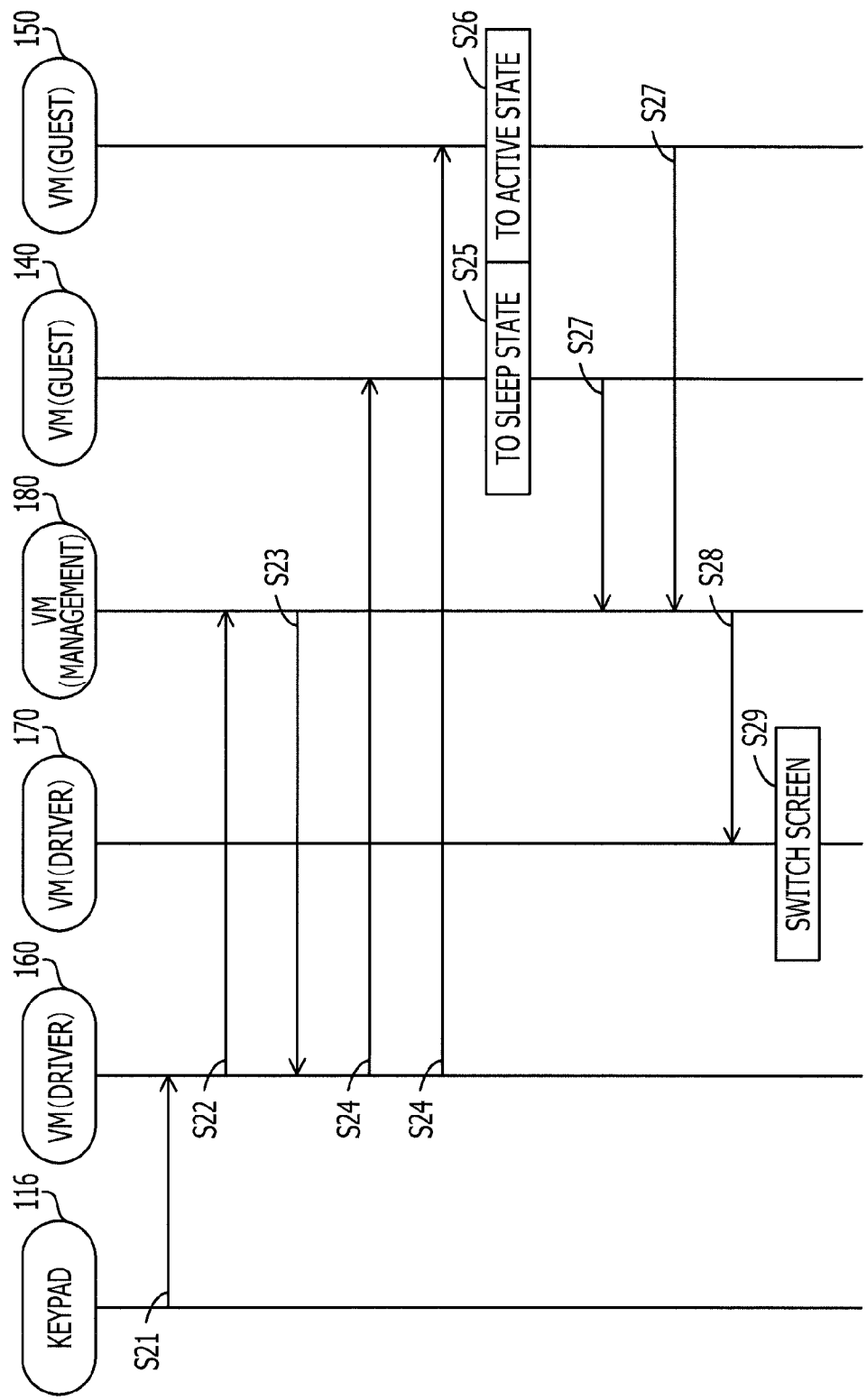
FIG. 8 is a sequence diagram illustrating switching control of OSs in response to input from a user.

FIG. 8 is a sequence diagram illustrating the switching control of OSs. In FIG. 8, it is assumed that user input indicating that the front OS is to be switched from the OS 141 to the OS 151 is received when the OS 141 is in the active state and the OS 151 is in the sleep state. The sequence illustrated in FIG. 8 will be described below in the order of reference numbers.

In S21, the keypad 116 outputs an input signal indicating that the user has pressed the button 116a to the key driver 161 of the virtual machine 160.

In S22, upon receiving the input signal, the key driver 161 informs the switching controller 184 of the virtual machine 180 that the user has performed an input operation to give an instruction to change the OS.

In S23, the switching controller 184 determines that the current front OS is the OS 141 and instructs the key driver 161 to change the front OS from the OS 141 to the OS 151.

In S24, the key driver 161 supplies virtual information that there has been input from the user to give an instruction to switch OFF the screen (e.g., turn OFF the backlight) to the key driver 142 of the virtual machine 140. The key driver 142 then informs the OS 141 that the screen is to be switched OFF. The key driver 161 also supplies virtual information that there has been input from the user to give an instruction to switch ON the screen (e.g., turn ON backlight) to the key driver 152 of the virtual machine 150. The key driver 152 then informs the OS 151 that the screen is to be switched ON.

In S25, the OS 141 shifts from the active state to the sleep state. For example, the OS 141 stops execution of an application software program, such as moving-picture playback software or a web browser. The OS 141 also instructs the display driver 143 to stop generating screen frames. The display driver 143 stops generating screen frames, and the frame buffer 144 stops outputting screen frames to the display device 114.

In S26, the OS 151 shifts from the sleep state to the active state. For example, the OS 151 instructs the display driver 153 to restart generating screen frames. If the screen state is stored immediately before the OS 151 has shifted to the sleep state, the OS 151 instructs the display driver 153 to reproduce such a screen state. The display driver 153 then restarts generating screen frames, and the frame buffer 154 restarts outputting screen frames to the display device 114.

In S27, the OS 141 informs the switching controller 184 of the virtual machine 180 that the OS 141 has shifted from the active state to the sleep state. The OS 151 informs the switching controller 184 that the OS 151 has shifted from the sleep state to the active state.

In S28, the switching controller 184 instructs the display driver 171 of the virtual machine 170 to change the front OS from the OS 141 to the OS 151.

In S29, the display driver 171 controls the display device 114 so that the display device 114 displays screen frames output from the frame buffer 154 of the virtual machine 150 instead of screen frames output from the frame buffer 144 of the virtual machine 140.

Figure 9:
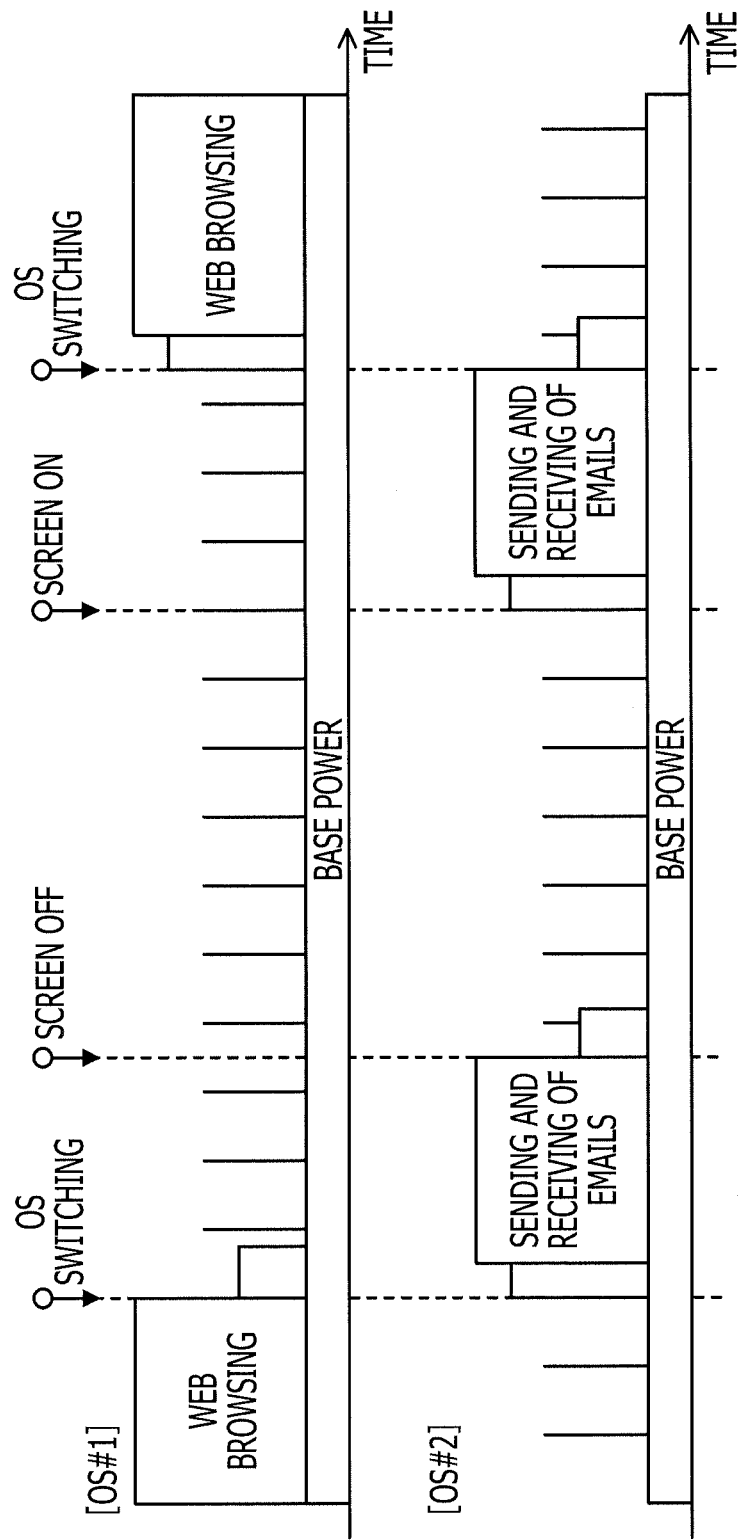
FIG. 9 illustrates a first example of a change in power consumption.

FIG. 9 illustrates a first example of a change in power consumption. The CPU 111 executes the OS 141 (OS #1) and the OS 151 (OS #2) in a time division manner. Accordingly, the total of a load on the OS 141 and application software executed under the OS 141 and a load on the OS 151 and application software executed under the OS 151 influences the power consumption. The information terminal apparatus 100 regularly performs wireless communication with the base station 21 since it maintains connection with the mobile communication network 20 even while application software does not perform communication.

While web browsing is being performed under the OS 141, the information terminal apparatus 100 consumes power due to the execution of a web browser under the OS 141, in addition to base power for executing the OSs 141 and 151.

Then, when a user performs an operation to change the OS, the OS 141 recognizes that the screen is to be switched OFF, and the OS 151 recognizes that the screen is to be switched ON. The OS 141 then stops execution of the web browser and shifts to the sleep state. The OS 151 shifts to the active state and displays a screen on the display device 114. Then, in response to an instruction to send and receive emails from the user, the OS 151 starts execution of software for sending and receiving emails. At this time, the information terminal apparatus 100 consumes power due to the sending and receiving of emails under the OS 151, in addition to base power. However, since the OS 141 has stopped execution of application software and shifted to the sleep state, power consumption in the background is suppressed.

Then, when the user performs an operation to switch OFF the screen (depression of the button 116b), the OS 151 recognizes that the screen is to be switched OFF. The OS 151 then stops execution of application software for sending and receiving emails and shifts to the sleep state. At this time, since both the OSs 141 and 151 have shifted to the sleep state, the power consumption is restricted to base power and power for performing regular wireless communication with the base station 21.

Then, when the user performs an operation to switch ON the screen (depression of the button 116b), the OS 151 recognizes that the screen is to be switched ON. The OS 151 then shifts to the active state and displays a screen on the display device 114. Then, in response to an instruction to send and receive emails from the user, the OS 151 starts execution of software for sending and receiving emails. At this time, the information terminal apparatus 100 consumes power in accordance with the sending and receiving of emails executed under the OS 151, in addition to base power for executing the OSs 141 and 151.

Then, when the user performs an operation to change the OS, the OS 151 recognizes that the screen is to be switched OFF, and the OS 141 recognizes that the screen is to be switched ON. The OS 151 stops execution of application software for sending and receiving emails and shifts to the sleep state. The OS 141 shifts to the active state and displays a screen on the display device 114. Then, in response to an instruction to perform web browsing from the user, the OS 141 starts the web browser. At this time, the information terminal apparatus 100 consumes power due to the execution of the web browser under the OS 141, in addition to base power. However, since the OS 151 has stopped execution of application software and shifted to the sleep state, power consumption in the background is suppressed.

In this manner, upon receiving input indicating an instruction to change the OS from the user, the information terminal apparatus 100 shifts the OS executed in the background to the sleep state. Even if the user does not explicitly stop application software before changing the OS, the application software executed under the OS in the background is automatically terminated without being left running.

Figure 10:
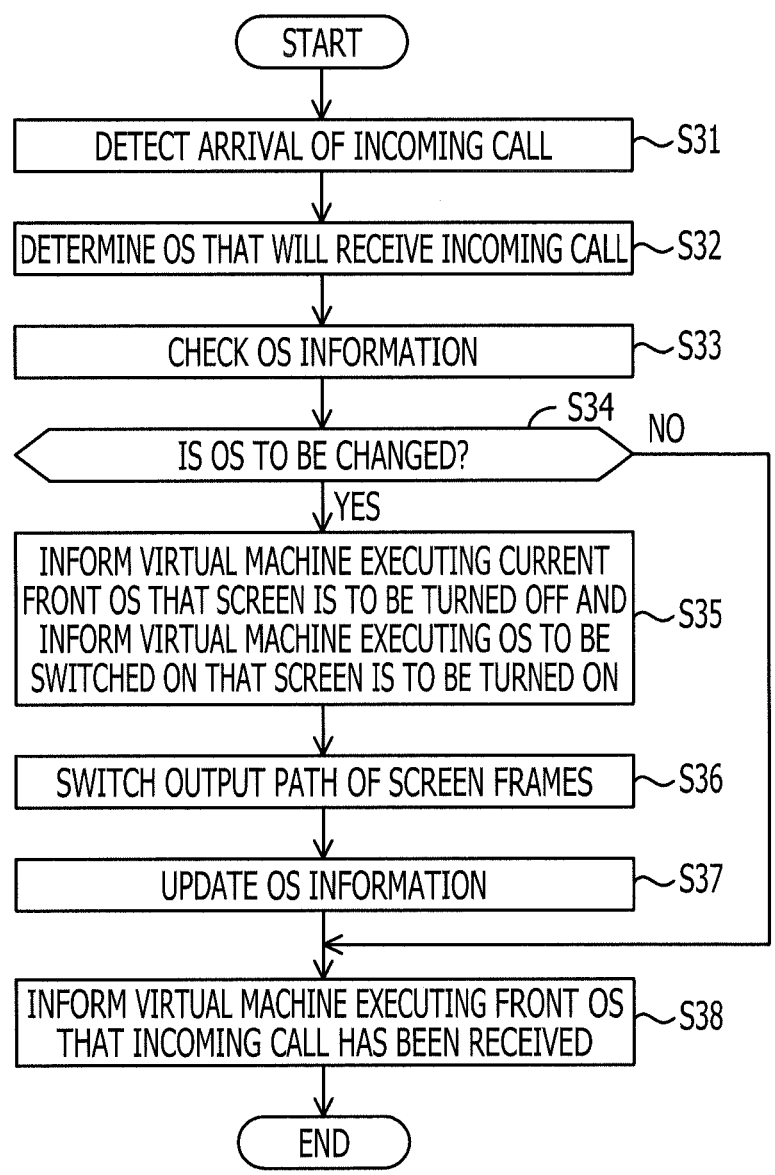
FIG. 10 is a flowchart illustrating switching control of OSs in response to incoming call.

FIG. 10 is a flowchart illustrating switching control of OSs in response to arrival of an incoming call. The processing illustrated in FIG. 10 will be described below in the order of reference numbers.

In S31, upon extracting, from a received signal, incoming data indicating the arrival of an incoming call in the information terminal apparatus 100, the CPU 122 outputs the incoming data to the incoming controller 183 of the virtual machine 180. The incoming controller 183 detects on the basis of the incoming data that an incoming call has been received.

In S32, the incoming controller 183 extracts the service ID from the incoming data and determines the communication service desired by the other communication party. The incoming controller 183 then searches the incoming information table 185 stored in the incoming information storage unit 182 for the OS that may process the communication service, and determines the OS to receive the incoming call. The incoming controller 183 then informs the switching controller 184 of the determined OS.

In S33, the switching controller 184 refers to the OS information stored in the OS information storage unit 181 and determines the current front OS. The following description of the flowchart of FIG. 10 will be given, assuming that the current front OS is the OS 141.

In S34, the switching controller 184 determines whether to change the OS. If the OS to receive the incoming call is the same as the current front OS, the switching controller 184 determines that the OS is not to be changed, and the process proceeds to S38. If the OS to receive the incoming call is different from the current front OS, the switching controller 184 determines that the OS is to be changed, and the process proceeds to S35.

In S35, the switching controller 184 instructs the key driver 161 of the virtual machine 160 to supply information that there has been input from the user to switch ON the screen and to inform that there has been input from the user to switch OFF the screen. The key driver 161 then informs the OS 141, which is to be switched OFF, via the key driver 142 of the virtual machine 140 that the screen is to be switched OFF. The key driver 161 also informs the OS 151, which is to be switched ON, via the key driver 152 of the virtual machine 150 that the screen is to be switched ON.

In S36, the switching controller 184 instructs the display driver 171 of the virtual machine 170 to switch the path of screen frames to be output to the display device 114. The display driver 171 changes the OS to which the display device 114 is assigned from the OS 141 to the OS 151, and switches the path of screen frames.

In S37, the switching controller 184 writes information indicating that the front OS is the OS 151 into the OS information storage unit 181.

In S38, the incoming controller 183 informs the incoming controller (incoming controller 145 or 155) executed under the front OS that an incoming call has been received from the mobile communication network 20.

Figure 11:
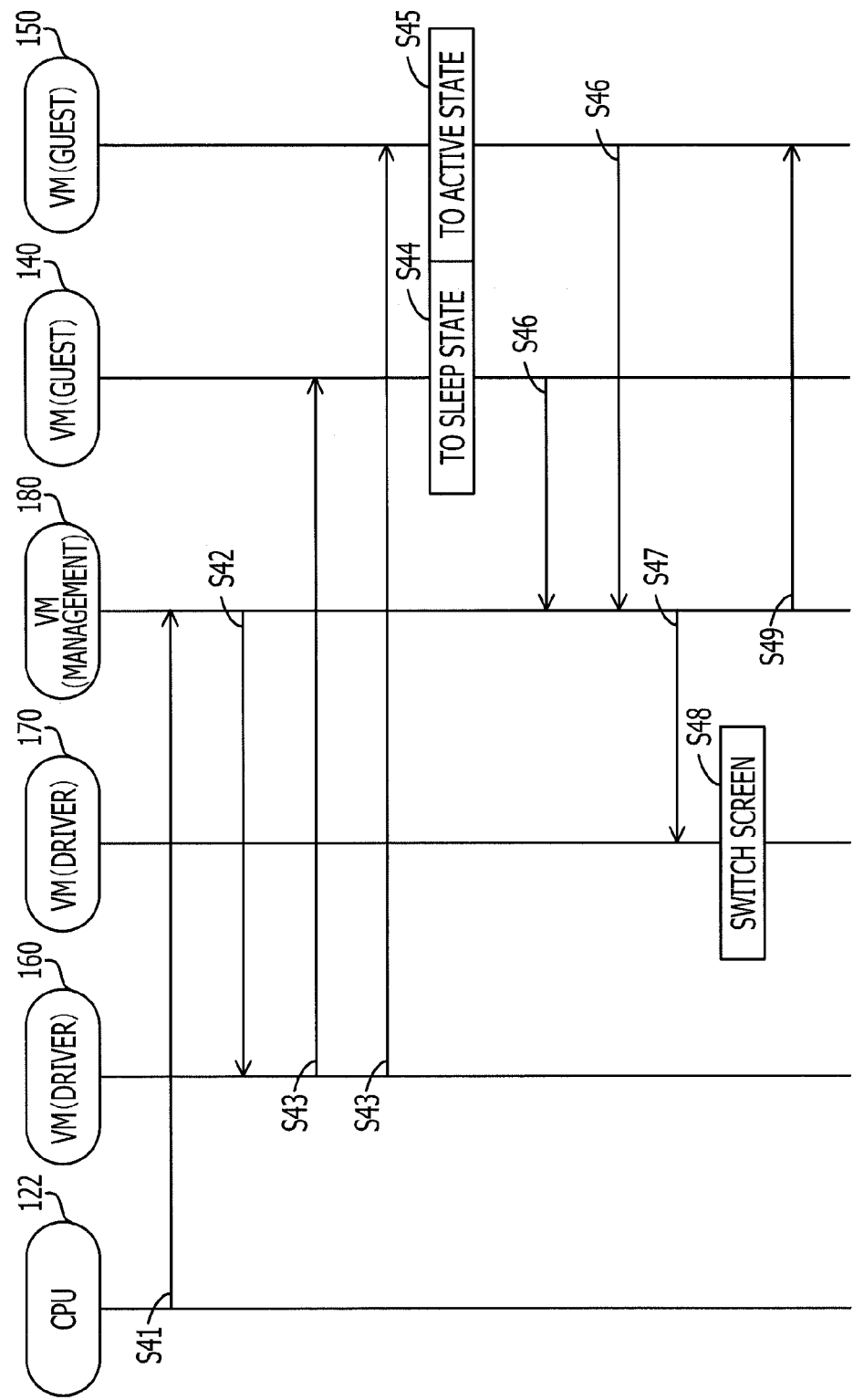
FIG. 11 is a sequence diagram illustrating switching control of OSs in response to incoming call.

FIG. 11 is a sequence diagram illustrating the switching control of OSs in response to the arrival of an incoming call. It is now assumed that an incoming call to be processed by the OS 151 is received when the OS 141 is in the active state and the OS 151 is in the sleep state and that the front OS is to be changed from the OS 141 to the OS 151. The sequence illustrated in FIG. 11 will be described below in the order of reference numbers.

In S41, the CPU 122 outputs incoming data extracted from a received signal to the incoming controller 183 of the virtual machine 180.

In S42, the incoming controller 183 recognizes that the received incoming call is to be processed by the OS 151. The switching controller 184 checks that the current front OS is the OS 141 and determines that the OS is to be changed. The switching controller 184 then instructs the key driver 161 of the virtual machine 160 to change the front OS from the OS 141 to the OS 151.

In S43, the key driver 161 supplies virtual information that there has been user input to switch OFF the screen to the key driver 142 of the virtual machine 140. The key driver 142 then informs the OS 141 that the screen is to be switched OFF. The key driver 161 also supplies virtual information that there has been user input to switch ON the screen to the key driver 152 of the virtual machine 150. The key driver 152 then informs the OS 151 that the screen is to be switched ON.

In S44, the OS 141 shifts from the active state to the sleep state. For example, the OS 141 stops execution of an application software program. The OS 141 also instructs the display driver 143 to stop generating screen frames. The display driver 143 stops generating screen frames, and the frame buffer 144 stops outputting screen frames to the display device 114.

In S45, the OS 151 shifts from the sleep state to the active state. For example, the OS 151 instructs the display driver 153 to restart generating screen frames. The display driver 153 then restarts generating screen frames, and the frame buffer 154 restarts outputting screen frames to the display device 114.

In S46, the OS 141 informs the switching controller 184 of the virtual machine 180 that the OS 141 has shifted from the active state to the sleep state. The OS 151 informs the switching controller 184 that the OS 151 has shifted from the sleep state to the active state.

In S47, the switching controller 184 instructs the display driver 171 of the virtual machine 170 to change the front OS from the OS 141 to the OS 151.

In S48, the display driver 171 controls the display device 114 so that the display device 114 displays screen frames output from the frame buffer 154 of the virtual machine 150 instead of screen frames output from the frame buffer 144 of the virtual machine 140.

In S49, the incoming controller 183 informs the incoming controller 155 of the virtual machine 150 that an incoming call has been received from the mobile communication network 20.

Figure 12:
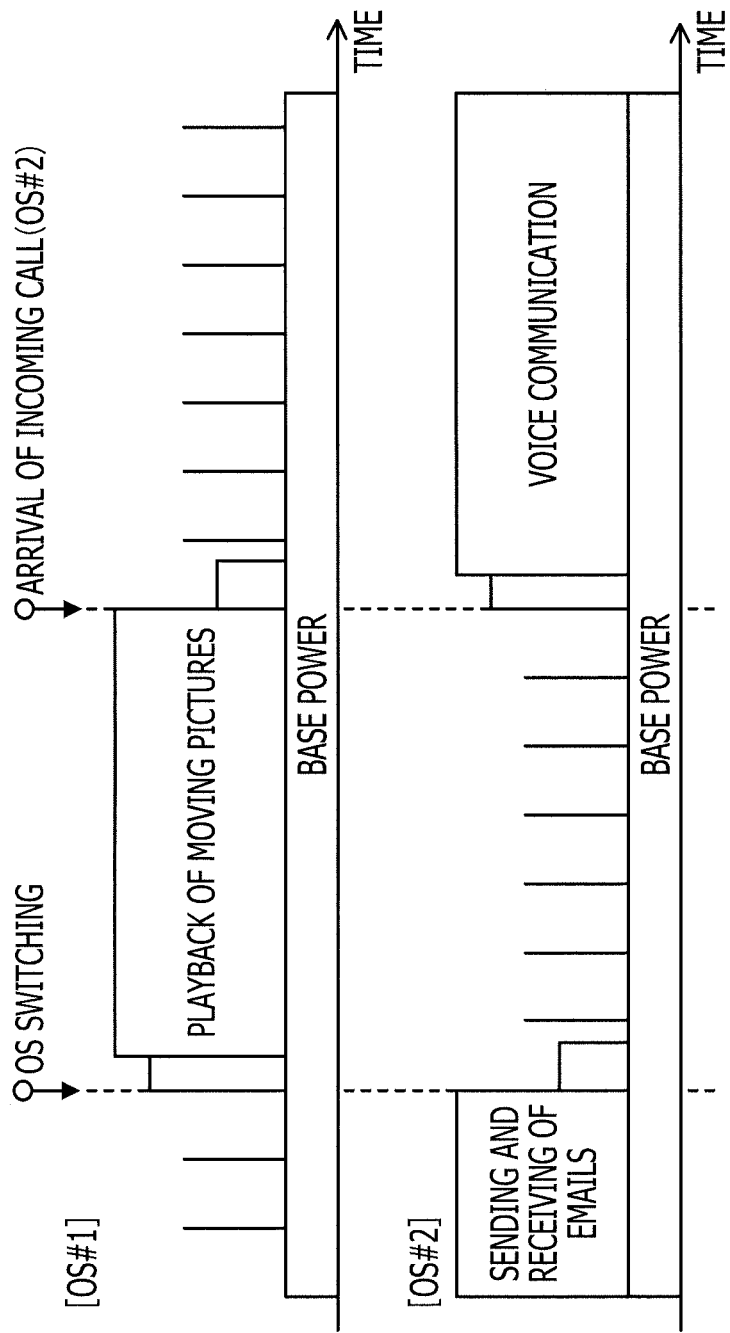
FIG. 12 illustrates a second example of a change in power consumption.

FIG. 12 illustrates a second example of a change in power consumption. When application software for sending and receiving emails is being executed under the OS 151, the information terminal apparatus 100 consumes power due to the sending and receiving of emails under the OS 151, in addition to base power for executing the OSs 141 and 151.

Then, when a user performs an operation to change the OS, the OS 151 recognizes that the screen is to be switched OFF, and the OS 141 recognizes that the screen is to be switched ON. The OS 151 stops execution of application software and shifts to the sleep state. The OS 141 shifts to the active state and displays a screen on the display device 114. Then, in response to an instruction to play back moving pictures from the user, the OS 141 starts execution of software for playing back moving pictures. At this time, the information terminal apparatus 100 consumes power due to the playback operation of moving pictures under the OS 141, in addition to base power. However, since the OS 151 has stopped execution of application software and shifted to the sleep state, power consumption in the background is suppressed.

Then, upon receiving an incoming telephone call to be processed by the OS 151, the OS 141 recognizes that the screen is to be switched OFF, and the OS 151 recognizes that the screen is to be switched ON. The OS 141 stops execution of application software for playing back moving pictures and shifts to the sleep state. The OS 151 shifts to the active state and displays a screen on the display device 114. The OS 151 then starts execution of software for voice communication. At this time, the information terminal apparatus 100 consumes power due to the voice communication under the OS 151, in addition to base power. However, since the OS 141 has stopped execution of application software and shifted to the sleep state, power consumption in the background is suppressed.

In this manner, upon receiving an incoming call that causes change of the OS, the information terminal apparatus 100 shifts the OS executed in the background to the sleep state. Even if the user does not explicitly stop execution of application software before changing the OS, the application software executed under the OS in the background is automatically terminated without being left running.

A description will now be given of power consumption when changing the OS, assuming that the information terminal apparatus 100 does not inform an OS, which will be switched OFF, that the screen is to be switched OFF, nor does it inform an OS, which will be switched ON, that the screen is to be switched ON.

Figure 13:
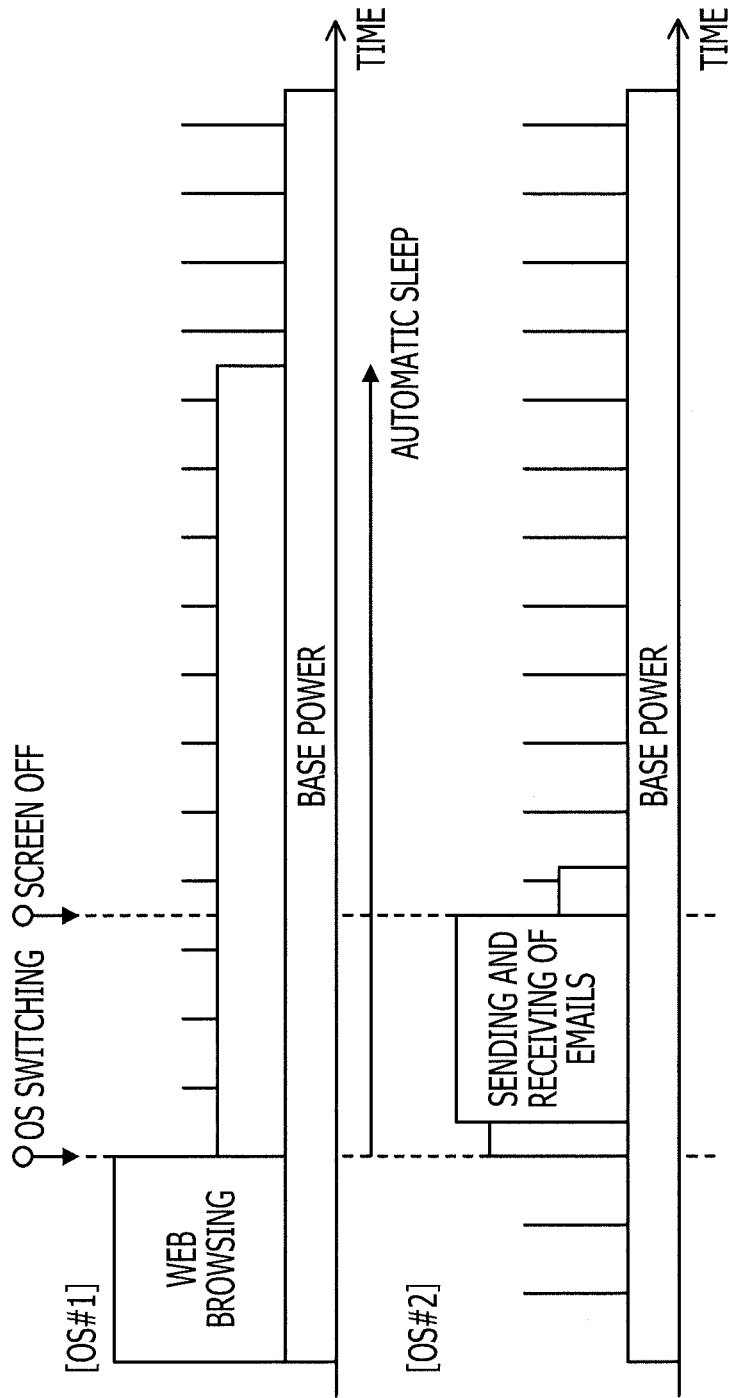
FIG. 13 is a first diagram illustrating another example of a change in power consumption.

FIG. 13 is a first diagram illustrating another example of a change in power consumption. If web browsing is being performed under the OS 141, the information terminal apparatus 100 consumes power due to the execution of the web browser under the OS 141, in addition to base power for executing the OSs 141 and 151.

Then, when the user performs an operation to give an instruction to change the OS and then to send and receive emails on the screen provided by the OS 151, the OS 151 starts execution of software for sending and receiving emails. In this case, although the assignment of the display device 114 is changed from the OS 141 to the OS 151, the input of user is not informed to the OS 141, and accordingly, the OS 141 is maintained in the active state and continues executing the web browser. Thus, the information terminal apparatus 100 consumes power due to the execution of the web browser under the OS 141, in addition to base power and power for sending and receiving emails under the OS 151.

Then, when the user performs an operation to give an instruction to switch OFF the screen, the OS 151 stops execution of application software for sending and receiving emails and shifts to the sleep state. In this case, although the display device 114 is switched OFF (e.g., the backlight is turned OFF), the OS 141 executed in the background is left running. Accordingly, the OS 141 is maintained in the active state and continues executing the web browser until it automatically shifts to the sleep state after the lapse of a predetermined period (e.g., one minute or ten minutes) for which user input has not been detected. Thus, the information terminal apparatus 100 consumes power due to the execution of the web browser in addition to base power.

Figure 14:
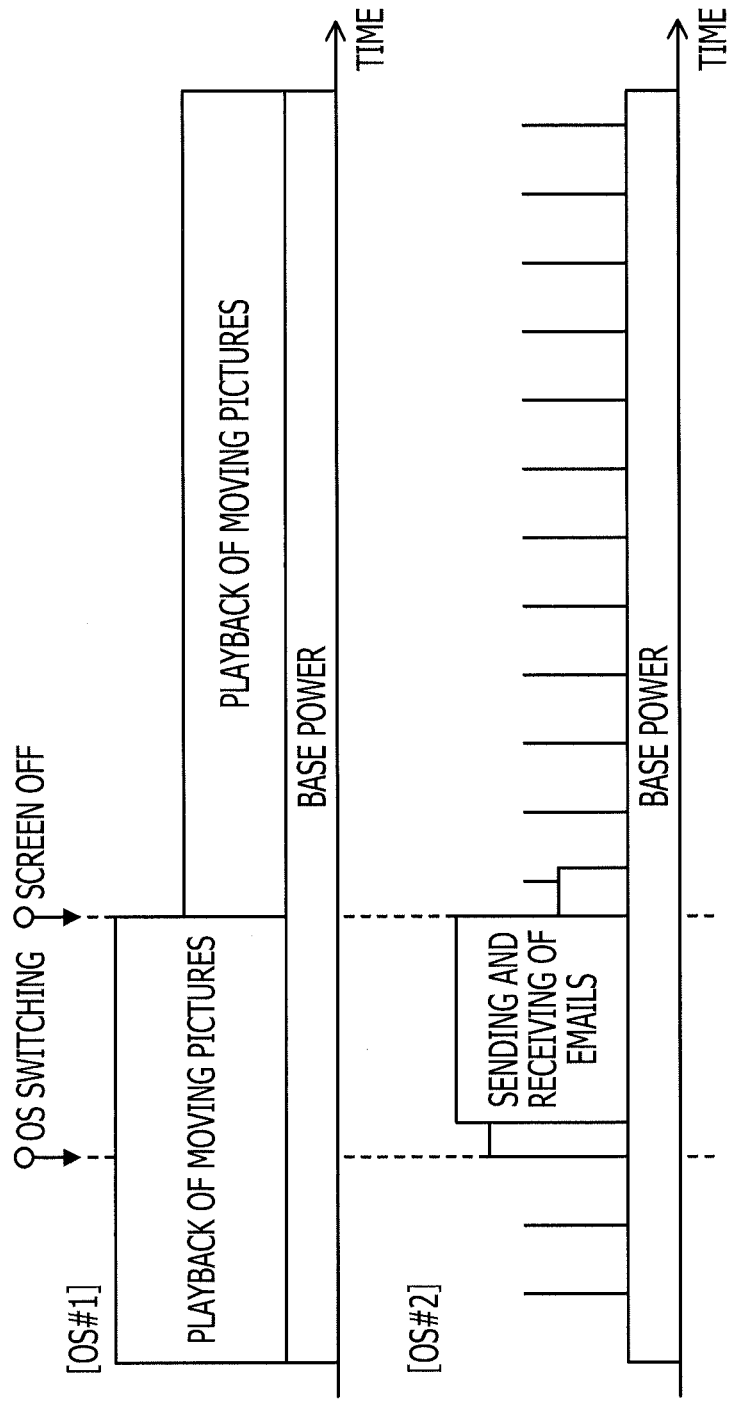
FIG. 14 is a second diagram illustrating another example of a change in power consumption.

FIG. 14 is a second diagram illustrating another example of a change in power consumption. If moving pictures are being played back under the OS 141, the information terminal apparatus 100 consumes power due to the playback operation of moving pictures under the OS 141, in addition to base power for executing the OSs 141 and 151.

Then, when the user performs an operation to give an instruction to change the OS and then to send and receive emails on the screen provided by the OS 151, the OS 151 starts execution of software for sending and receiving emails. In this case, although the assignment of the display device 114 is changed from the OS 141 to the OS 151, the input of user is not informed to the OS 141, and accordingly, the OS 141 is maintained in the active state and continues playing back moving pictures. Thus, the information terminal apparatus 100 consumes power for the playback operation of moving pictures under the OS 141, in addition to base power and power for sending and receiving emails under the OS 151.

Then, when the user performs an operation to give an instruction to switch OFF the screen, the OS 151 stops execution of application software for sending and receiving emails and shifts to the sleep state. In this case, although the display device 114 is switched OFF (e.g., the backlight is turned OFF), the OS 141 executed in the background is left running. Accordingly, the OS 141 is maintained in the active state and continues playing back moving pictures. Thus, the information terminal apparatus 100 consumes power due to the playback operation of moving pictures (however, power for backlight is not consumed) in addition to base power.

Figure 15:
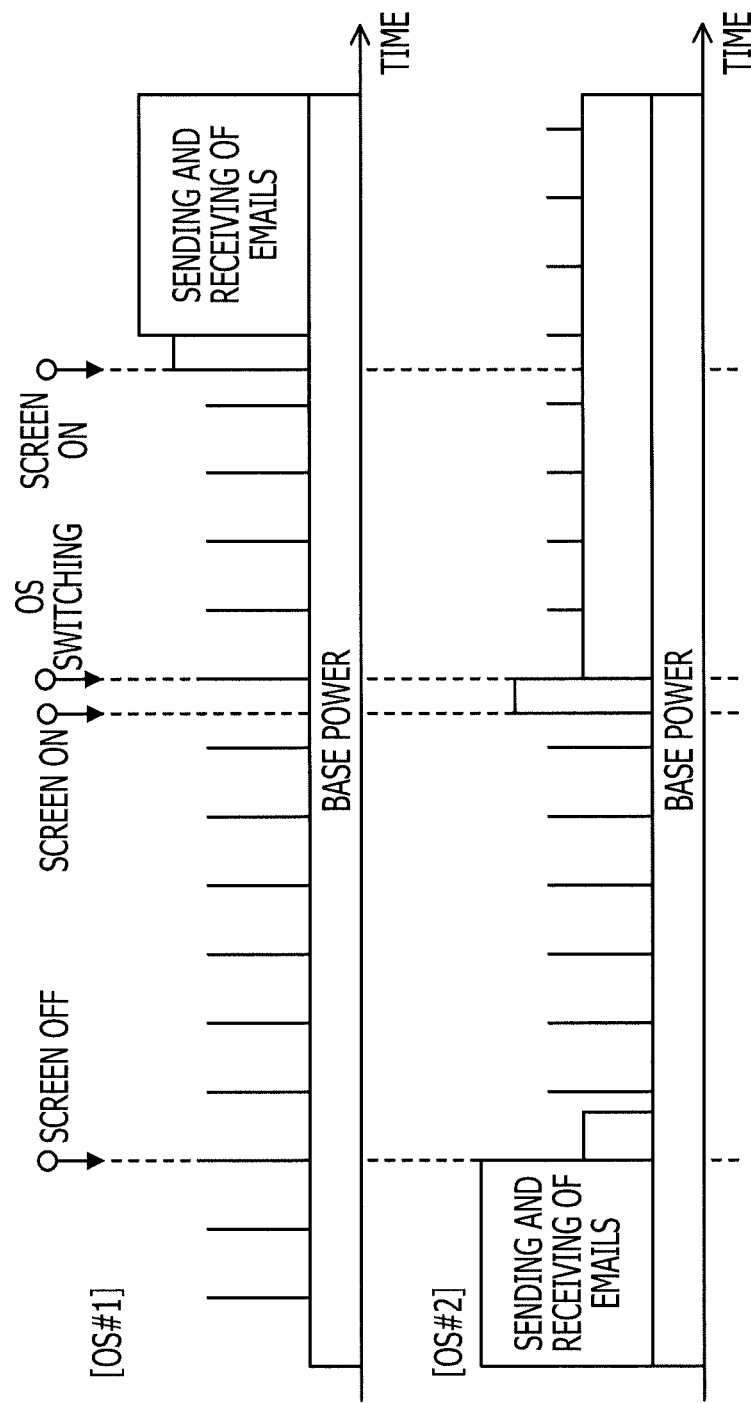
FIG. 15 is a third diagram illustrating another example of a change in power consumption.

FIG. 15 is a third diagram illustrating another example of a change in power consumption. If sending and receiving of emails is being performed under the OS 151, the information terminal apparatus 100 consumes power due to the sending and receiving of emails under the OS 151, in addition to base power for executing the OSs 141 and 151.

Then, when the user performs an operation to give an instruction to switch OFF the screen, the OS 151 stops execution of application software for sending and receiving emails and shifts to the sleep state. At this time, both the OSs 141 and 151 have shifted to the sleep state, and thus, power consumption is restricted to base power and regular wireless communication with the base station 21.

Then, when the user performs an operation to give an instruction to switch ON the screen, the OS 151 shifts to the active state and displays a screen on the display device 114. Then, when the user performs an operation to give an instruction to change the OS, the assignment of the display device 114 is changed from the OS 151 to the OS 141. However, since user input is not informed to the OS 141, the OS 141 is maintained in the sleep state and does not display a screen on the display device 114. When the user performs an operation to give an instruction to switch ON the screen, the OS 141 shifts to the active state and displays a screen on the display device 114. In response to an instruction to send and receive emails from the user, the OS 141 starts execution of software for sending and receiving emails.

Figure 16:
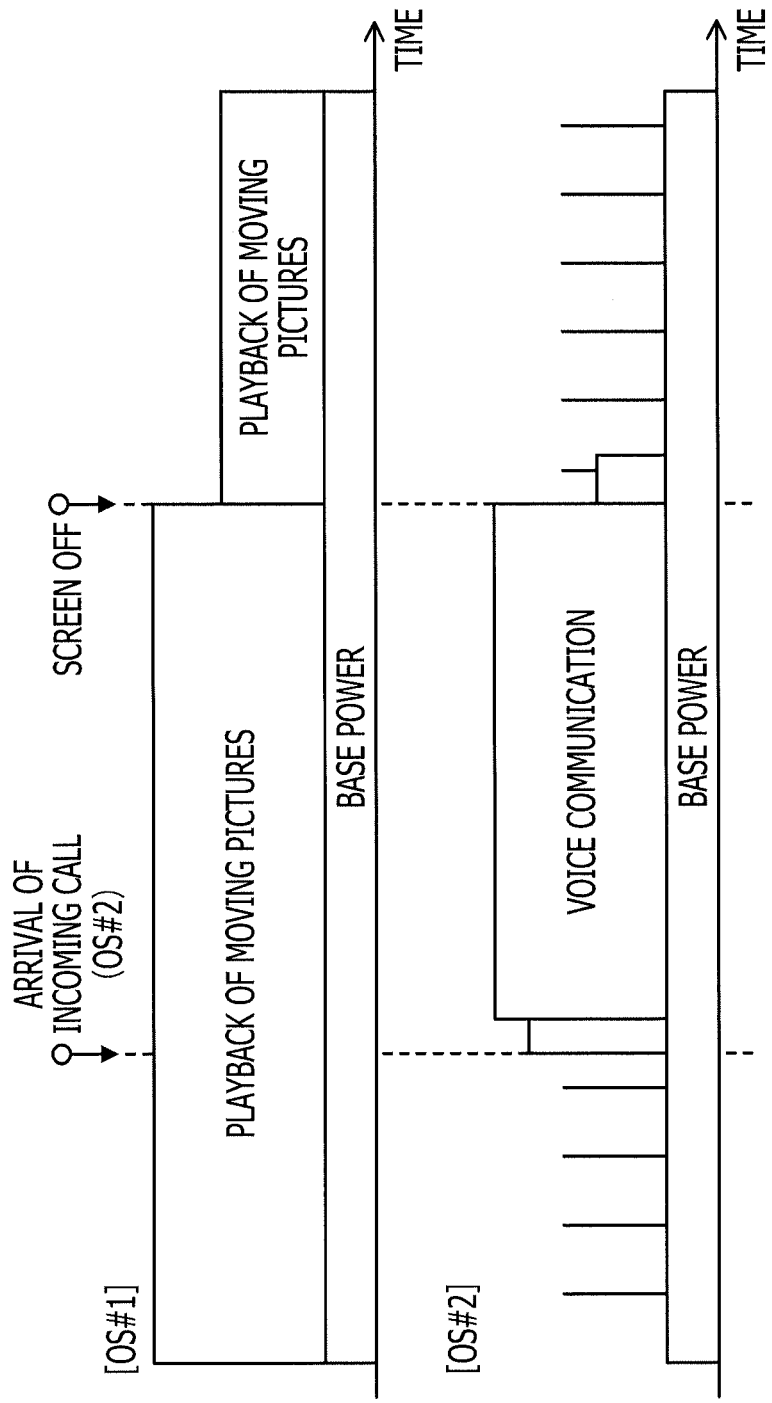
FIG. 16 is a fourth diagram illustrating another example of a change in power consumption.

FIG. 16 is a fourth diagram illustrating another example of a change in power consumption. If moving pictures are being played back under the OS 141, the information terminal apparatus 100 consumes power due to the playback operation of moving pictures under the OS 141, in addition to base power for executing the OSs 141 and 151.

Then, when an incoming telephone call to be processed by the OS 151 is received, the front OS is changed from the OS 141 to the OS 151. The OS 151 starts execution of software for voice communication. In this case, although the assignment of the display device 114 is changed from the OS 141 to the OS 151, the OS 141 is maintained in the active state and continues playing back moving pictures. Accordingly, the information terminal apparatus 100 consumes power due to the playback operation of moving pictures under the OS 141, in addition to base power and power for voice communication under the OS 151.

Then, when voice communication is finished and the user performs an operation to give an instruction to switch OFF the screen, the OS 151 stops execution of application software and shifts to the sleep state. At this time, although the display device 114 is switched OFF, the OS 141 executed in the background is left running and continues playing back moving pictures. Thus, the information terminal apparatus 100 consumes power due to the playback operation of moving pictures (however, power for backlight is not consumed), in addition to base power.

As described above, upon receiving input indicating an instruction to change the OS from a user, if the OS to which the display device 114 is assigned is merely changed, power for continuing processing under the OS to which the display device 114 is not assigned may be wasted. Similarly, when an incoming call that causes the switching of the OS is received, power for continuing processing under the OS to which the display device 114 is not assigned may be wasted. Additionally, the OS which is switched ON does not promptly start generating screen frames, and thus, the screen may be temporarily turned OFF when changing the OS.

Programs to be executed by the information terminal apparatus 100 may be recorded on the information terminal apparatus 100 in advance, or may be transmitted to the information terminal apparatus 100 from an information processing apparatus (e.g., server computer) connected to a network via the mobile communication network 20.

Figure 17:
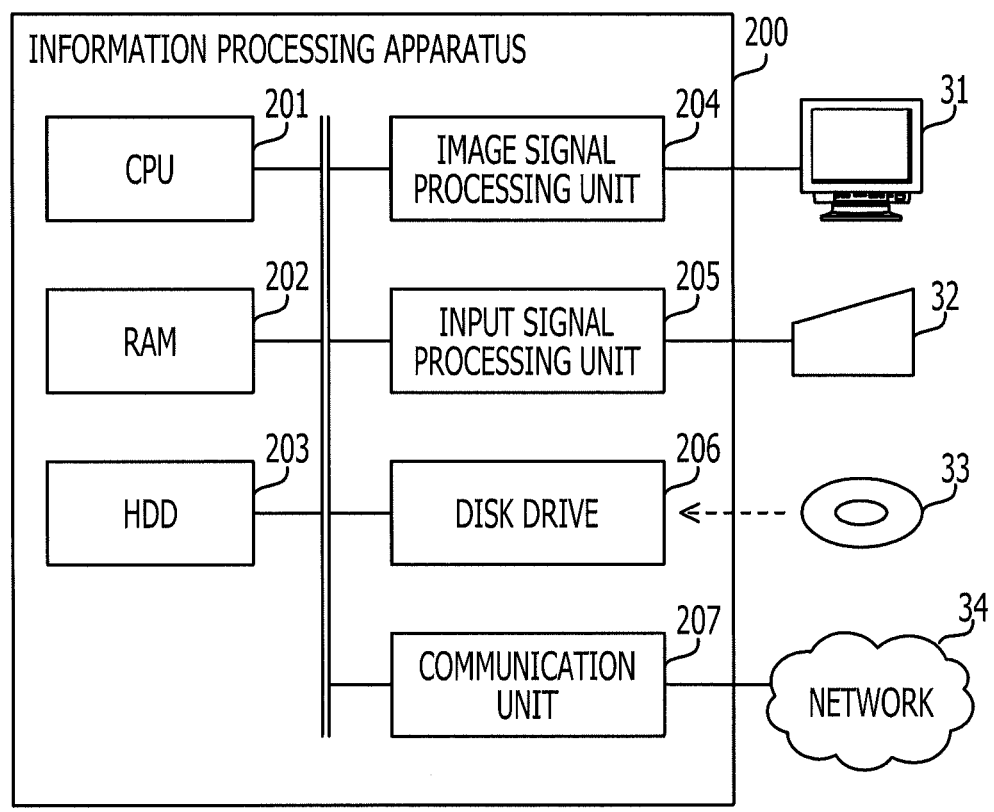
FIG. 17 is a block diagram illustrating an exemplary hardware configuration of an information processing apparatus.

FIG. 17 is a block diagram illustrating an exemplary hardware configuration of an information processing apparatus 200. The information processing apparatus 200 includes a CPU 201, a RAM 202, a hard disk drive (HDD) 203, an image signal processing unit 204, an input signal processing unit 205, a disk drive 206, and a communication unit 207. The above-described units are connected to a bus within the information processing apparatus 200.

The CPU 201 is an arithmetic unit that controls information processing executed in the information processing apparatus 200. The CPU 201 reads at least some of programs and data stored in the HDD 203, loads the read programs and data to the RAM 202, and executes the programs. The information processing apparatus 200 may include a plurality of arithmetic units and may execute information processing in a distributed manner.

The RAM 202 is a volatile memory in which programs and data handled by the CPU 201 are temporarily stored. The information processing apparatus 200 may include a memory other than a RAM, or include a plurality of memories.

The HDD 203 is a non-volatile storage unit in which programs, such as an OS program and application programs, and data used for information processing are stored. The HDD 203 reads and writes programs and data from and into a built-in magnetic disk in accordance with instructions of the CPU 201. The information processing apparatus 200 may include a non-volatile storage unit (e.g., a solid state drive (SSD)) other than an HDD, or may include a plurality of storage units.

The image signal processing unit 204 outputs images to a display device 31 connected to the information processing apparatus 200 in accordance with instructions from the CPU 201. As the display device 31, a cathode ray tube (CRT) display or a liquid crystal display may be used.

The input signal processing unit 205 obtains an input signal from an input device 32 connected to the information processing apparatus 200 and outputs the input signal to the CPU 201. As the input device 32, a pointing device, such as a mouse or a touch panel, or a keyboard may be used.

The disk drive 206 is a drive unit that reads programs and data recorded on a recording medium 33. As the recording medium 33, a magnetic disk, such as a flexible disk (FD) or an HDD, an optical disc, such as a compact disc (CD) or a digital versatile disc (DVD), or a magneto-optical disk (MO) may be used. The disk drive 206 stores programs and data read from the recording medium 33 in the RAM 202 or the HDD 203 in accordance with instructions from the CPU 201.

The communication unit 207 is a communication interface that connects to a network 34 to perform communication. Connection to the network 34 may be wired communication or wireless communication. That is, the communication unit 207 may be a wired communication interface or a wireless communication interface. The communication unit 207 communicates with the information terminal apparatus 100 via, for example, the network 34 and the mobile communication network 20.

Programs executed by the information terminal apparatus 100 may be recorded on a computer readable recording medium (e.g., recording medium 33). As the computer readable recording medium, a magnetic disk, an optical disc, a magneto-optical disk, or a semiconductor memory may be used. Examples of a magnetic disk are an FD and a hard disc. Examples of an optical disc are a CD, a CD-Recordable/Rewritable (CD-R/RW), a DVD, and a DVD-R/RW.

If programs are distributed, a portable recording medium recording thereon such programs is provided. Alternatively, the programs may be stored in a storage device of a computer, such as the information processing apparatus 200, and may be distributed via the network 34. The information terminal apparatus 100, for example, obtains such programs and stores them in a non-volatile storage device, and then reads the programs from the storage device and executes them. The information terminal apparatus 100 may directly execute the obtained programs without storing them in the storage device.

According to the information terminal apparatus 100 of the second embodiment, when changing the front OS, it is possible for an OS to be switched OFF to recognize that input to give an instruction to switch OFF the screen has been received from a user in a virtual manner, and for an OS to be switched ON to recognize that input to give an instruction to switch ON the screen has been received from a user in a virtual manner. Accordingly, the OS to be switched OFF may suppress processing executed in the background, for example, by stopping execution of application software for displaying a screen on the display device 114. Thus, a load on the information terminal apparatus 100 may be reduced, thereby decreasing the power consumption and improving the processing speed. Additionally, the OS to be switched ON may promptly restart displaying a screen on the display device 114. Thus, immediately after the OS is changed, the screen provided by the OS that has been switched ON is displayed on the display device 114 without the user performing an operation to give an instruction to switch ON the screen, thereby facilitating the efficient use of user interfaces.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information terminal apparatus comprising:
a first memory to store front information indicating a front operating system that controls a user interface of the information terminal apparatus, the front operating system being either one of a first operating system and a second operating system;
a second memory to store an incoming information table, the incoming information table including correspondence between an ID identifying each of a plurality of communication services that can be specified by an incoming call and a respective one of the first operating system and the second operating system;
a processor to:
concurrently run a first virtual machine that executes the first operating system and a second virtual machine that executes the second operating system,
detect arrival of an incoming call,
extract, from an incoming data, a service ID that identifies a communication service,
check the front information to determine the current front operating system,
determine, based on the extracted service ID and information stored in the incoming information table, that the front operating system is to be changed from the first operating system to the second operating system, when the current front operating system is the first operating system,
notify, upon the determination, the first virtual machine of a first notification to cause the first operating system to selectively stop application software which uses the user interface, the first notification indicating the control of the user interface by the first operating system is to stop,
notify, upon the determination, the second virtual machine of a second notification indicating that the control of the user interface by the second operating system is to restart,
cause, in response to the first notification, the first operating system to stop application software which uses the user interface and shift from active state to sleep state,
cause, in response to the second notification, the second operating system to shift from sleep state to active state and restart control of the user interface, and
set the front information to indicate the second operating system as the front operating system.

2. The information terminal apparatus according to claim 1, wherein the processor is further configured to
accept input information indicating to change the front operating system, and
determine, based on the input information, that the front operating system is to be changed from the first operating system to the second operating system.

3. The information terminal apparatus according to claim 1, wherein
the processor receives an incoming message from a network, and
the processor determines, upon reception of an incoming message to be processed by the second virtual machine, that the front operating system is to be changed from the first operating system to the second operating system.

4. The information terminal apparatus according to claim 1, wherein the first notification indicates input information for stopping display on a screen, and the second notification indicates input information for restarting display on the screen.

5. An information terminal apparatus comprising:
a first memory to store front information indicating a front operating system that controls a user interface of the information terminal apparatus, the front operating system being either one of a first operating system and a second operating system;
a second memory to store an incoming information table, the incoming information table including correspondence between an ID identifying each of a plurality of communication services that can be specified by an incoming call and a respective one of the first operating system and the second operating system;
a first processor to
concurrently run a first virtual machine that executes the first operating system and a second virtual machine that executes the second operating system;
a second processor to
  detect arrival of an incoming call,
  extract, from an incoming data, a service ID that identifies a communication service,
  check the front information to determine the current front operating system,
  determine, based on the extracted service ID and information stored in the incoming information table, that the front operating system is to be changed from the first operating system to the second operating system, when the current front operating system is the first operating system,
  notify, upon the determination, the first virtual machine of a first notification to cause the first operating system to selectively stop application software which uses the user interface, the first notification indicating the control of the user interface by the first operating system is to stop,
  notify, upon the determination, the second virtual machine of a second notification indicating that the control of the user interface by the second operating system is to restart,
  cause, in response to the first notification, the first operating system to stop application software which uses the user interface and shift from active state to sleep state,
  cause, in response to the second notification, the second operating system to shift from sleep state to active state and restart control of the user interface, and set the front information to indicate the second operating system as the front operating system.

6. An information terminal apparatus comprising:
a first memory to store front information indicating front operating system that controls a user interface of the information terminal apparatus, the front operating system being either one of a first operating system and a second operating system;
a second memory to store an incoming information table, the incoming information table including correspondence between an ID identifying each of a plurality of communication services that can be specified by an incoming call and a respective one of the first operating system and the second operating system;
a first processor to execute the first operating system;
a second processor to execute the second operating system concurrently with the first processor executing the first operating system;
a third processor to:
  detect arrival of an incoming call,
  extract, from an incoming data, a service ID that identifies a communication service,
  check the front information to determine the current front operating system,
  determine, based on the extracted service ID and information stored in the incoming information table that display of the front operating system is to be changed from the first operating system to the second operating system, when the current front operating system is the first operating system,
  notify, upon the determination, the first processor of a first notification to cause the first operating system to selectively stop application software which uses the user interface, the first notification indicating that the control of the user interface by the first operating system is to stop,
  notify, upon the determination, the second processor of a second notification indicating that the control of the user interface by the second operating system is to restart;
the first processor, further configured to
  cause, in response to the first notification, the first operating system to stop application software which uses the user interface and shift from active state to sleep state; and
the second processor, further configured to:
  cause, in response to the second notification, the second operating system to shift from sleep state to active state and restart control of the user interface, and
  set the front information to indicate the second operating system as the front operating system.

7. A method executed by an information terminal apparatus, the method comprising:
maintaining an incoming information table, the incoming information table including correspondence between an ID identifying each of a plurality of communication services that can be specified by an incoming call and a respective one of the first operating system and the second operating system;
concurrently running a first virtual machine that executes a first operating system and a second virtual machine that executes a second operating system;
detecting arrival of an incoming call;
extracting, from an incoming data, a service ID that identifies a communication service;
checking a front information to determine a current front operating system that controls a user interface of the information terminal apparatus;
determining, based on the extracted service ID and information stored in an incoming information table, that the front operating system is to be changed from the first operating system to the second operating system, when the current front operating system is the first operating system;
notifying, upon the determination, the first virtual machine of a first notification to cause the first operating system to selectively stop application software which uses the user interface, the first notification indicating that the control of the user interface by the first operating system is to stop;
notifying, upon the determination, the second virtual machine of a second notification indicating that the control of the user interface by the second operating system is to restart;
causing, in response to the first notification, the first operating system to stop application software which uses the user interface and shift from active state to sleep state;
causing, in response to the second notification, the second operating system to shift from sleep state to active state and restart control of the user interface; and setting the front information to indicate the second operating system as the front operating system.

8. A non-transitory computer-readable medium storing a program that causes a computer to execute a procedure comprising:

maintaining an incoming information table, the incoming information table including correspondence between an ID identifying each of a plurality of communication services that can be specified by an incoming call and a respective one of the first operating system and a second operating system;

concurrently running a first virtual machine that executes a first operating system and a second virtual machine that executes a second operating system;

detecting arrival of an incoming call;

extracting, from an incoming data, a service ID that identifies a communication service;

checking a front information to determine a current front operating system that controls a user interface of the computer;

determining, based on the extracted service ID and information stored in an incoming information table, when the current front operating system is the first operating system, that the front operating system is to be changed from the first operating system to the second operating system;

notifying, upon the determination, the first virtual machine of a first notification to cause the first operating system to selectively stop application software which uses the user interface, the first notification indicating that the control of the user interface by the first operating system is to stop;

notifying, upon the determination, the second virtual machine of a second notification indicating that the control of the user interface by the second operating system is to restart;

causing, in response to the first notification, the first operating system to stop application software which uses the user interface and shift from active state to sleep state;

causing, in response to the second notification, the second operating system to shift from sleep state to active state and restart control of the user interface; and setting the front information to indicate the second operating system as the front operating system.

* * * * *